US012798548B2

(12) United States Patent
Lefevre

(10) Patent No.: US 12,798,548 B2
(45) Date of Patent: Nov. 17, 2026

(54) METHOD AND SYSTEM FOR CONTROLLING A HYBRID POWERTRAIN ON THE BASIS OF TORQUE GRADIENTS

(71) Applicants: AMPERE S.A.S, Boulogne Billancourt (FR); NISSAN MOTOR CO., LTD., Kanagawa (FR)

(72) Inventor: Aurélien Lefevre, Lardy (FR)

(73) Assignees: AMPERE S.A.S, Boulogne Billancourt (FR); NISSAN MOTOR CO., LTD., Kanagawa (JP)

( * ) Notice: Subject to any disclaimer, the term of this patent is extended or adjusted under 35 U.S.C. 154(b) by 70 days.

(21) Appl. No.: 18/858,062

(22) PCT Filed: Apr. 24, 2023

(86) PCT No.: PCT/EP2023/060660

§ 371 (c)(1),
(2) Date: Oct. 18, 2024

(87) PCT Pub. No.: WO2023/208847

PCT Pub. Date: Nov. 2, 2023

(65) Prior Publication Data

US 2025/0269833 A1 Aug. 28, 2025

(30) Foreign Application Priority Data

Apr. 27, 2022 (FR) ....................................... 2203956

(51) Int. Cl.
*B60W 20/11* (2016.01)
*B60W 10/06* (2006.01)
(Continued)

(52) U.S. Cl.
CPC ............ *B60W 20/11* (2016.01); *B60W 10/06* (2013.01); *B60W 30/1882* (2013.01);
(Continued)

(58) Field of Classification Search
CPC ..................................................... B60W 20/11
See application file for complete search history.

(56) References Cited

U.S. PATENT DOCUMENTS

2009/0157244 A1 6/2009 Kim
2014/0046523 A1* 2/2014 Lado .................. B60W 10/115
903/902
(Continued)

FOREIGN PATENT DOCUMENTS

DE 103 23 722 A1 12/2004
GB 2593920 A 10/2021

OTHER PUBLICATIONS

International Search Report mailed on Jul. 14, 2023 in PCT/EP2023/060660 filed on Apr. 24, 2023 (2 pages).
(Continued)

*Primary Examiner* — Imran K Mustafa
(74) *Attorney, Agent, or Firm* — Oblon, McClelland, Maier & Neustadt, L.L.P.

(57) ABSTRACT

A system for controlling a motor vehicle hybrid powertrain includes a set of calculators and a switch that determine the operating point and the overall consumptions of the powertrain and a combustion engine raw torque setpoint, determine a gradient of an equivalence factor as a function of the consumptions of the powertrain, determine a crankshaft torque gradient as a function of the target torque required at the wheel and of the step-down gear ratio, determine combustion engine torque gradient minimum and maximum values as a function of the gradient of the equivalence factor, of the crankshaft torque gradient, and of look-up tables, and determine an optimal torque setpoint as a function of the raw torque setpoint and of the combustion engine torque gradient minimum and maximum values.

10 Claims, 2 Drawing Sheets

(51) Int. Cl.
*B60W 30/188* (2012.01)
*B60W 50/00* (2006.01)

(52) U.S. Cl.
CPC ..... *B60W 50/00* (2013.01); *B60W 2050/0026* (2013.01); *B60W 2050/0052* (2013.01); *B60W 2510/0657* (2013.01); *B60W 2510/244* (2013.01)

(56) References Cited

U.S. PATENT DOCUMENTS

| | | | | |
|---|---|---|---|---|
| 2023/0116281 | A1 | 4/2023 | Williams | |
| 2023/0311844 | A1* | 10/2023 | Pi | B60W 10/26 701/22 |

OTHER PUBLICATIONS

Preliminary French Search Report dated Nov. 14, 2022 in French Application 2203956 filed on Apr. 27, 2022, (with English Translation of Categories of Cited Documents).

* cited by examiner

METHOD AND SYSTEM FOR CONTROLLING A HYBRID POWERTRAIN ON THE BASIS OF TORQUE GRADIENTS

TECHNICAL FIELD

The invention relates to the technical field of the control of hybrid powertrains.

A hybrid motor vehicle is generally equipped with a combustion engine and with one or more electric motors. Such a hybrid motor vehicle, like other motor vehicles, needs to be able to conform to pollution-control standards in each of the countries in which the vehicle is marketed, and to enable a gain in performance and a gain in terms of improved fuel consumption.

Hybrid motor vehicles may be equipped with various powertrains. Powertrains referred to as "mild hybrid", in which the combustion engine is combined with an electric machine able to operate as a motor or as a generator, are notably known. The primary driveshaft is connected to the combustion engine crankshaft, for example by elastic means of the belt type. The primary driveshaft is associated with a gearbox so as to offer a plurality of possible transmission ratios between the rotational speed of the engine and the rotational speed of the primary driveshaft. The electric machine is then coupled to the combustion engine and the ratio at which it drives the wheels is unable to vary independently of that of the combustion engine.

Powertrains in which the step-down gear ratios for the engine and for the electric machine are independent of one another are also known. For example, document FR-A1-3022495 discloses an arrangement with a combustion engine and at least a first electric machine mounted at the end of the shaft.

Independently of hybridizing the vehicle powertrain, it is necessary to have a control method able to manage the distribution of the motive power of the vehicle between the various traction members. In other words, the driver's request for torque is distributed between the combustion engine and the electric machine(s), with due consideration to the respective transmission ratios and any other constraints there might be. These constraints notably include the following:

- Consideration of the "driver's wishes", through the degree to which the throttle pedal is depressed
- Pollution-control
- Thermal comfort (heating of the vehicle interior)
- NVH (Noise, Vibration, and Harshness) management This control method comprises a series of steps also referred to hereinafter as "energy management law" operating in two phases, the first being that of defining the field of optimization as a function of the aforementioned constraints, and the second being that of energy optimization associated with the overall consumption of the powertrain.

The field of optimization consists in defining ranges of possible torques for the combustion engine and for the electric machine(s). The following examples illustrate the field of optimization for various constraints.

- For pollution control constraints, in the event of cold-weather operation entailing rapid heating of a pollution-control catalytic converter, a window of high torques may be imposed on the combustion engine to make it possible to increase the thermal losses.
- For vibration constraints, a limit may be imposed on the gearbox ratios, and the combustion engine torque may be limited to a predetermined range dependent on the rotational speed.
- For vehicle-interior heating constraints, a minimum torque to be achieved may be imposed on the combustion engine in order to cause the temperature of the coolant to increase rapidly thereby increasing the temperature to which the vehicle interior is heated.

Since this field of optimization is generally not restricted to a single choice of torques for each motive-power source, the energy management law may therefore define the operating point/optimal distribution of torque or of power between the traction members for optimizing the overall consumption of the powertrain as a function of the energy present in the battery and of the driver's demand for torque at the wheel.

Since the field of optimization is generally an open field, depending on the type of optimization present in the energy management law, the optimal operating point may change very quickly as a function of the physical parameters and the energy manifestations of the traction members.

Consider the example of a linear model for the consumption of a combustion engine, of the type $$Cons_{ENG(T_{ENG})} = A\_ENG * T\_ENG + B\_ENG \qquad \text{(Eq. 1)}$$

where:

- A_ENG and B_ENG are coefficients dependent on the rotational speed of the combustion engine, and
- T_ENG is the torque required at output from the combustion engine.

Consider also the example of a second-order polynomial model of the consumption of an electric motor, of the type $$Cons_{ME(T_{ME})} = A\_ENG * T\_ME^2 + B\_ME * T\_ME + C\_ME \qquad \text{(Eq. 2)}$$

where:

- A_ME and B_ME and C_ME are coefficients dependent on the rotational speed of the electric motor, and
- T_ME is the torque required at output from the electric motor.

It can happen that, in certain operating scenarios, the rotational speeds of the electric machine and of the combustion engine are out of phase (for example because of lash in the gearbox, in the flywheel, or because of the elasticity of the belt connecting the engine crankshaft and the output shaft of the electric machine, etc.), and that certain physical mechanisms give rise to fluctuations in the rotational speed, for example the management of valve lift in variable-lift valves leads to fluctuations in the rotational speed of the combustion engine at certain operating points.

The phase difference between the electrical model (Eq. 2) and the thermal model (Eq. 1) means that at a given instant t, the combustion engine has a consumption lower than that of the electric machine. This phase difference therefore causes the consumption optimization to emit a combustion-engine torque target that is higher than that of the electric motor.

It then follows that, at a later instant t+δt, because of the phase difference between the electrical and thermal models, it is the electric motor that exhibits the lower consumption. The consumption optimization then emits a combustion-engine torque target that is not as high as that of the electric motor.

The situations described at the instants t and t+δt may succeed one another and give rise to torque fluctuations. The phase difference between the consumption models for the combustion engine and for the electric motors therefore has a tendency to increase and to sustain even more dynamically the fluctuation in the optimal-torque setpoints.

The operating point thus becomes unstable in certain situations because of the self-sustaining fluctuating behavior of the management law.

The technical problem to be addressed is thus that of how to inhibit any fluctuation and instability of the hybrid powertrain that is associated with the way in which the optimal operating point is determined by the energy management for while at the same time conforming to the field of optimization and the normal evolutions of this point.

SUMMARY OF THE INVENTION

The invention relates to a method for controlling a motor vehicle hybrid powertrain comprising a combustion engine and at least one electric machine associated with a battery, comprising the following steps:

- an energy control law is used to determine a raw torque setpoint for the combustion engine as a function of the overall consumption of the powertrain, the consumption of the combustion engine and of at least one electric machine,
- an equivalence factor and the gradient of the equivalence factor are determined as a function of the current energy present in the battery and of the target battery energy,
- the crankshaft torque is determined as a function of the target torque required at the wheel and of the step-down gearing, which are obtained from the energy management law, and the crankshaft torque gradient is determined,
- a combustion engine torque gradient minimum value and a combustion engine torque gradient maximum value are determined using parameterizable tables each dependent on the gradient of the equivalence factor and on the filtered crankshaft target torque gradient,
- the optimal combustion engine torque is determined as a function of the combustion engine raw torque setpoint by limiting the dynamics of change thereof as a function of the combustion engine torque gradient minimum value and the combustion engine torque gradient maximum value.

The control method as claimed in claim 1, comprising a step of first-order filtering of the crankshaft torque gradient as a function of a memory-stored time constant.

The method may comprise the following steps:

- it is determined that a first logic value adopts a first value if a predefined minimum value for the optimal combustion engine torque is higher than the optimal combustion engine torque value, and if such is not the case, the first logic value adopts a second value,
- it is determined that a second logic value adopts a first value if the predefined maximum value for the optimal combustion engine torque is lower than the optimal combustion engine torque value, and if such is not the case, the second logic value adopts a second value,
- a selection value is determined as a function of the logic OR operation performed between the first logic value and the second logic value,
- for the determination of the optimal combustion engine torque, a first set comprising the combustion engine torque gradient minimum value and the combustion engine torque gradient maximum value by way of final minimum combustion engine torque gradient and final maximum combustion engine torque gradient is transmitted if the selection value adopts the first value, and a second set of predefined values comprising a default combustion engine torque gradient minimum value and a default combustion engine torque gradient maximum value is transmitted if the selection value adopts the second value.

The default combustion engine torque gradient minimum value may adopt a value that is lower than the combustion engine torque gradient minimum value, and the default combustion engine torque gradient maximum value may adopt a value that is higher than the combustion engine torque gradient maximum value.

The invention also relates to a system for controlling a motor vehicle hybrid powertrain, comprising a first calculation means configured to execute an energy management law so as to determine a combustion engine raw torque setpoint, the control system comprising:

- a second calculation means and a third calculation means which are configured to determine a gradient of an equivalence factor of the current energy present in the battery and of the target battery energy,
- a fourth calculation means and a fifth calculation means which are configured to determine a crankshaft torque gradient as a function of the target torque required of the wheel and of the step-down gear ratio, a sixth calculation means and a seventh calculation means which are configured respectively to determine a combustion engine torque gradient maximum value and minimum value as a function of the gradient of the equivalence factor, of the crankshaft torque gradient and of a table stored in the memory of the respective calculation means, and an eighth calculation means configured to determine an optimal torque setpoint as a function of the raw torque setpoint and of the combustion engine torque gradient minimum and maximum values so as to modify the dynamics of change thereof.

The system may comprise a filtering means configured to perform first-order filtering of the crankshaft torque gradient transmitted to the sixth calculation means and to the seventh calculation means, as a function of a memory-stored time constant.

The system may comprise a first memory containing a default combustion engine torque gradient minimum value and a default combustion engine torque gradient maximum value, a second memory containing an optimal combustion engine torque minimum value and an optimal combustion engine torque maximum value, and a first comparison means configured to emit a first value if the current optimal combustion engine torque value is higher than the optimal combustion engine torque minimum value, and if not, to emit a second value,

- a second comparison means configured to emit a first value if the current optimal combustion engine torque value is lower than the optimal combustion engine torque maximum value and, if not, to emit a second value,
- a Boolean operator configured to apply an OR truth table to the values received from the first comparison means and from the second comparison means,
- the switch being configured to transmit, to the eighth calculation means, the combustion engine torque gradient minimum value and the combustion engine torque gradient maximum value if a second value is received from the Boolean operator, and to transmit the default combustion engine torque gradient minimum value and the default combustion engine torque gradient maximum value if a first value is received from the Boolean operator.

BRIEF DESCRIPTION OF THE DRAWINGS

Other aims, features and advantages of the invention will become apparent on reading the following description, which is given merely by way of non-limiting example, and with reference to the appended drawings, in which.

DETAILED DESCRIPTION

Figure 1:
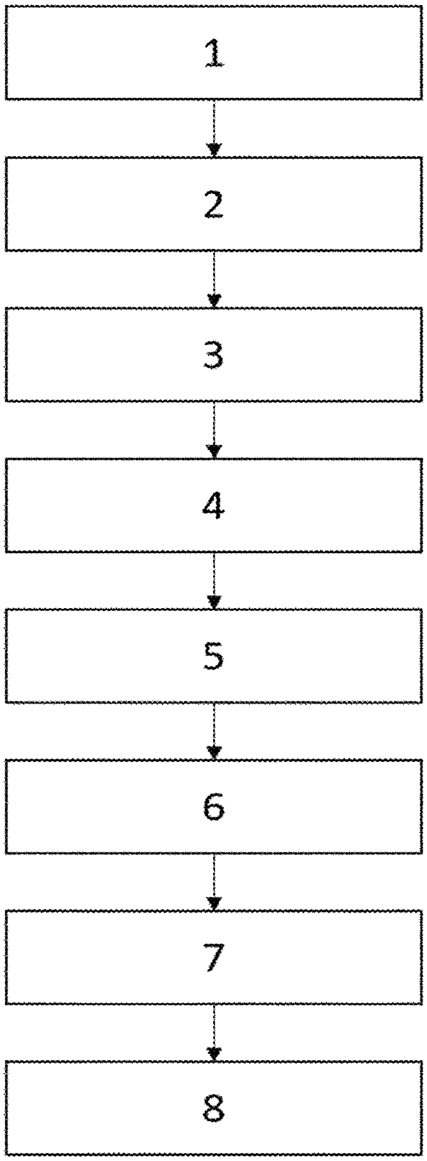
FIG. 1 illustrates the main steps of a control method according to the invention.

The method for controlling a motor vehicle hybrid powertrain has the objective of mastering and reducing the dynamics of change of the optimal operating point of the energy management law while at the same time ensuring compliance with the field of optimization at every instant and expected dynamics of change to battery energy conditions and current power/torque at wheel request. The hybrid powertrain comprises a combustion engine and at least one electric motor associated with a battery.

Let us define following variables:

- WHL_TQ_TG is the target torque required at the wheel, formulated on the basis of the driver's request and of third-party functions that have an impact on the formulation thereof (speed regulator, autonomous driving, etc.)
- ENG_TQ_OPT_MIN is the optimal combustion engine torque minimum value resulting from the upstream functions in the energy management law which handles the trade-off between constraints associated with drivability, thermal comfort, battery management, etc.
- ENG_TQ_OPT_MAX is the optimal combustion engine torque maximum value resulting from the upstream functions in the energy management law which handles the trade-off between constraints associated with drivability, thermal comfort, battery management, etc.
- ENG_TQ_OPT_RAW is the combustion engine raw torque setpoint derived from the energy management law, this being the torque the dynamics of evolution of which it is sought to reduce
- FAC_EQ is the electrical consumption equivalence factor based on the equivalent consumption minimization strategy;
- ENG_TQ_OPT is the combustion engine optimal torque, which is then fed into the function for creating the powertrain torque setpoints.
- EGY_CRT is the current energy present in the battery, this being information transmitted directly by the function that handles the monitoring of the battery.
- EGY_TGT is the target battery energy, calculated within the energy management function on the basis of a parameterized nominal target and on the basis of the specific energy requirements (the activation of the charging mode via a driver interface, an increase in energy in order to perform a specific pollution-control function, etc.).

The equivalence factor FAC_EQ makes it possible to determine the overall consumption of the powertrain $Cons_{overall(T_{ENG},T_{EM})}$ as a function of the consumption of the combustion engine $Cons_{ENG(T_{ENG})}$ and of the consumption of the electric machine(s) $Cons_{EM(T_{EM})}$, expressed as follows:

$$Cons_{overall(T_{ENG},T_{EM})} = Cons_{ENG(T_{ENG})} + Cons_{EM(T_{EM})} * \text{FAC\_EQ} \quad \text{(Eq. 3)}$$

In other words, the value FAC_EQ represents the equivalence factor expressing the equivalence between the consumption of at least one electric motor and of the combustion engine, this parameter being dynamically changing chiefly dependent on the level of energy present in the battery. This factor is greater than 1.

The equivalence factor FAC_EQ is usually constructed on the basis of the current energy present in the battery and of the energy target. In order to determine the value of the equivalence factor FAC_EQ, a proportional gain (EGY_FAC_GAIN) is applied to the difference between the current energy present in the battery and the energy target, then a neutral value (EGY_FAC_NEUTRAL) is added, that value implying that the electrical energy and the thermal energy are of equal worth.

The value of the proportional gain and the neutral value are generally parameterized iteratively.

A plurality of running cycles are performed with a plurality of set equivalence-factor values, making it possible:

- to find a neutral value, which value ensures that the electrical energy, although changing over the course of a cycle, is the same at the start of the cycle as at the end of the cycle.
- to find the values for which it is known how to estimate the gain or the electrical energy consumption per kilometer as a function of the energy at the start of the cycle, at the end of the cycle, and of the distance covered.

The proportional gain is thus parameterized in such a way as to obtain the desired charging/discharging as a function of the desired dynamics of change, which is generally a compromise between various performance aspects (availability of electric mode, unlimited exploitation of battery energy in order to optimize consumption, NVH involving a high level of recharging in order to get close to the target, etc.).

FIG. 1 illustrates the main steps of the control method according to the invention.

During the course of a first step 1, an energy management law is used to determine the operating point of the hybrid powertrain, namely a combustion engine raw torque setpoint ENG_TQ_OPT_RAW as a function of the overall consumption of the powertrain, via an analytical solution to the equation making it possible to define the operating point that involves the lowest possible consumption.

$$\frac{dCons_{overall(T_{ENG},T_{EM})}}{dT_{ENG}dT_{EM}} = 0 = \frac{\left(Cons_{ENG(T_{ENG})} + Cons_{EM(T_{EM})} * \text{FAC\_EQ 1}\right)}{dT_{ENG}dT_{EM}}$$

During the course of a second step 2, the equivalence factor FAC_EQ is determined as a function of the current energy present in the battery and of the target battery energy.

$$\text{FAC\_EQ} = (\text{EGY\_TGT} - \text{EGY\_CRT}) * \text{EGY\_FAC\_GAIN} + \text{EGY\_FAC\_NEUT}$$

where

EGY_FAC_GAIN is a parameterized proportional gain

EGY_FAC_NEUT, is an equivalence factor neutral value

The variation in the equivalence factor FAC_EQ over a predefined duration (for example one second) is then quantified. In order to do this, the current value of the equivalence factor FAC_EQ is subtracted from the value it had in the previous time step and the result is divided by this same time step. This then yields an equivalence factor gradient FAC_EQ_GRD that makes it possible to know how the equivalence factor FAC_EQ is changing over the predefined duration.

During the course of a third step 3, the target torque required at the wheel WHL_TQ_TG and the step-down gearing ENG_RAT are obtained from the energy management laws. The variation in crankshaft torque, and hence in combustion engine torque, is then quantified. To do that, the target torque required at the wheel WHL_TQ_TG is divided by the step-down gearing ENG_RAT between the combustion engine and the wheel. This then yields the crankshaft torque CRK_TQ_TG. The gradient of the crankshaft torque CRK_TQ_TG is determined in a similar way to the way in which the equivalence factor gradient FAC_EQ_GRD is calculated. More specifically, the current value of the crankshaft torque CRK_TQ_TG is subtracted from the value it had in the previous time step and the result is divided by this same time step. This then yields the crankshaft torque gradient CRK_TQ_TG_GRD that characterizes the change in the target wheel-torque setpoint at the crankshaft over the predetermined duration.

Since the crankshaft torque gradient CRK_TQ_TG_GRD may be affected by the noise of the change in target torque required at the wheel WHL_TQ_TG, a first order filter is introduced which has a time constant TAU that can be adjusted in order to obtain a filtered crankshaft target torque gradient CRK_TQ_TG_GRD_FIL.

During the course of a fourth step 4, a combustion engine torque gradient minimum value CRK_TQ_OPT_GRD_MIN_TABLE and a combustion engine torque gradient maximum value CRK_TQ_OPT_GRD_MAX_TABLE are determined by means of parameterizable two-dimensional tables TABLE_2D_GRD_POS_MIN and TABLE_2D_GRD_POS_MAX respectively, each of which is dependent on the equivalence factor gradient FAC_EQ_GRD and on the filtered crankshaft target torque gradient CRK_TQ_TG_GRD_FIL.

The combustion engine torque gradient minimum value CRK_TQ_OPT_GRD_MIN_TABLE and the combustion engine torque radiant maximum value CRK_TQ_OPT_GRD_MAX_TABLE are representative of the normal changes in combustion engine optimal torque. What is meant by "normal changes in combustion engine optimal torque" is the increase or decrease in torque that may naturally be observed upon a change in the filtered crankshaft torque gradient value CRK_TQ_TG_GRD_FIL and in the equivalence factor gradient FAC_EQ_GRD. The filtered crankshaft torque gradient value CRK_TQ_TG_GRD_FIL corresponds to the target torque setpoint required at the wheel WHL_TQ_TG, and therefore to the driver's wishes:

If the driver's wishes expressed in terms of crankshaft value increase by a value X (in Nm/s), the combustion engine optimal torque can be expected to increase by a value Y (in Nm/s) that is slightly greater than the value X, and that is parameterized in the first table TABLE_2D_GRD_POS_MAX.

If the equivalence factor increases, then the combustion engine optimal torque can be expected to increase by an amount of torque of value Z (in Nm/s) parameterized in the first table TABLE_2D_GRD_POS_MAX.

During the course of a fifth step 5, it is determined whether the combustion engine optimal torque minimum value ENG_TQ_OPT_MIN is higher than the combustion engine optimal torque value ENG_TQ_OPT. If it is, it is determined that a first logic value is equal to a first value. If it is not, it is determined that the first logic value is equal to a second value.

It is also determined whether the combustion engine optimal torque maximum value ENG_TQ_OPT_MAX is lower than the combustion engine optimal torque value ENG_TQ_OPT. If it is, it is determined that a second logic value is equal to a first value. If it is not, it is determined that the second logic value is equal to a second value.

During the course of a sixth step 6, a selection value is determined as a function of the logic OR operation performed between the first logic value and the second logic value. In other words, the selection value adopts a first value if at least one of the first and second logic values is equal to the first value. If it is not, the selection value adopts a second value.

During the course of a seventh step 7, the final combustion engine torque minimum gradient CRK_TQ_OPT_GRD_MIN and the final combustion engine torque maximum gradient CRK_TQ_OPT_GRD_MAX used thereafter for mastering and reducing the dynamics of change of the combustion engine optimal torque are selected from among a first set of values comprising the combustion engine torque gradient minimum value CRK_TQ_OPT_GRD_MIN_TABLE and the combustion engine torque gradient maximum value CRK_TQ_OPT_GRD_MAX_TABLE, and a second set of values comprising a default combustion engine torque gradient minimum value CRK_TQ_OPT_GRD_MIN_DFT and a default combustion engine torque gradient maximum value CRK_TQ_OPT_GRD_MAX_DFT, depending on the selection value.

More specifically, the first set of values is chosen if the selection value adopts the second value, and the second set of values is chosen if the selection value adopts the first value.

This choice of gradient makes it possible, in instances in which the combustion engine optimal torque value ENG_TQ_OPT, the dynamics of change of which have been decreased, falls outside the field of optimization defined by the rapid change in the combustion engine optimal torque minimum value ENG_TQ_OPT_MIN and in the combustion engine optimal torque maximum value ENG_TQ_OPT_MAX, to choose default gradients CRK_TQ_OPT_GRD_MIN_DFT and CRK_TQ_OPT_GRD_MAX_DFT that allow the combustion engine optimal torque ENG_TQ_OPT to be returned quickly or even instantly to within its field of optimization.

The default gradients CRK_TQ_OPT_GRD_MIN_DFT and CRK_TQ_OPT_GRD_MAX_DFT have a value that is generally respectively lower/higher than the nominal gradients taken from the two-dimensional tables.

Since the endpoints are dependent on the various constraints (pollution-control, car-interior thermal comfort, etc.), it may happen that one of the endpoints changes very quickly, or even instantly, upon activation of a function (for example: a markedly higher demand for car-interior heating): if the combustion engine optimal torque ENG_TQ_OPT is lying at the combustion engine optimal torque minimum value ENG_TQ_OPT_MIN and this value increases significantly and quickly in order to provide a torque for car-interior thermal comfort that requires the combustion engine to be heated up quickly by imposing a high minimum torque upon it, then it is absolutely essential to allow the combustion engine optimal torque ENG_TQ_OPT to conform to this new minimum endpoint: the combustion engine optimal torque ENG_TQ_OPT at the instant of the increase lies below the new combustion engine optimal torque minimum value ENG_TQ_OPT_MIN and the default gradients chosen therefore allow a rapid or even instantaneous increase in the combustion engine optimal torque ENG_TQ_OPT towards the combustion engine optimal torque minimum value ENG_TQ_OPT_MIN even though there has been no change in the driver's wishes or in the equivalence factor.

During the course of an eighth step 8, the combustion engine optimal torque ENG_TQ_OPT is determined as a function of the combustion engine raw torque setpoint ENG_TQ_OPT_RAW derived from the energy management law while limiting its dynamics of change as a function of the final combustion engine torque minimum gradient CRK_TQ_OPT_GRD_MIN and of the final combustion engine torque maximum gradient CRK_TQ_OPT_GRD_MAX by means of the following logic:

$$\text{ENG\_TQ\_OPT}(t) = \text{Max}(\text{Min}(\text{ENG\_TQ\_OPT\_RAW}(t); \text{ENG\_TQ\_OPT}(t-dt) + \text{CRK\_TQ\_OPT\_GRD\_MAX} * dt); \text{ENG\_TQ\_OPT}(t-dt) + \text{CRK\_TQ\_OPT\_GRD\_MIN} * dt)$$

Where t is the current calculation step and dt is the duration between two consecutive calculation steps in the strategy.

This determination thus makes it possible to obtain the combustion engine optimal torque ENG_TQ_OPT for which the dynamics of change is potentially lower than that of the combustion engine raw torque setpoint ENG_TQ_OPT_RAW.

The dynamics of change of the combustion engine optimal torque and the dynamics of change of the optimal operating point derived from the energy management law are thus mastered and reduced while at the same time maintaining the dynamics of change normally expected as a function of the parameters that have a direct impact on the choice thereof (torque at the wheel and equivalence factor) while guaranteeing that the field of optimization is adhered to at every instant.

The control method thus makes it possible to cancel the auto-induced fluctuation phenomenon while at the same time mastering the dynamics of change of the operating point.

Figure 2:
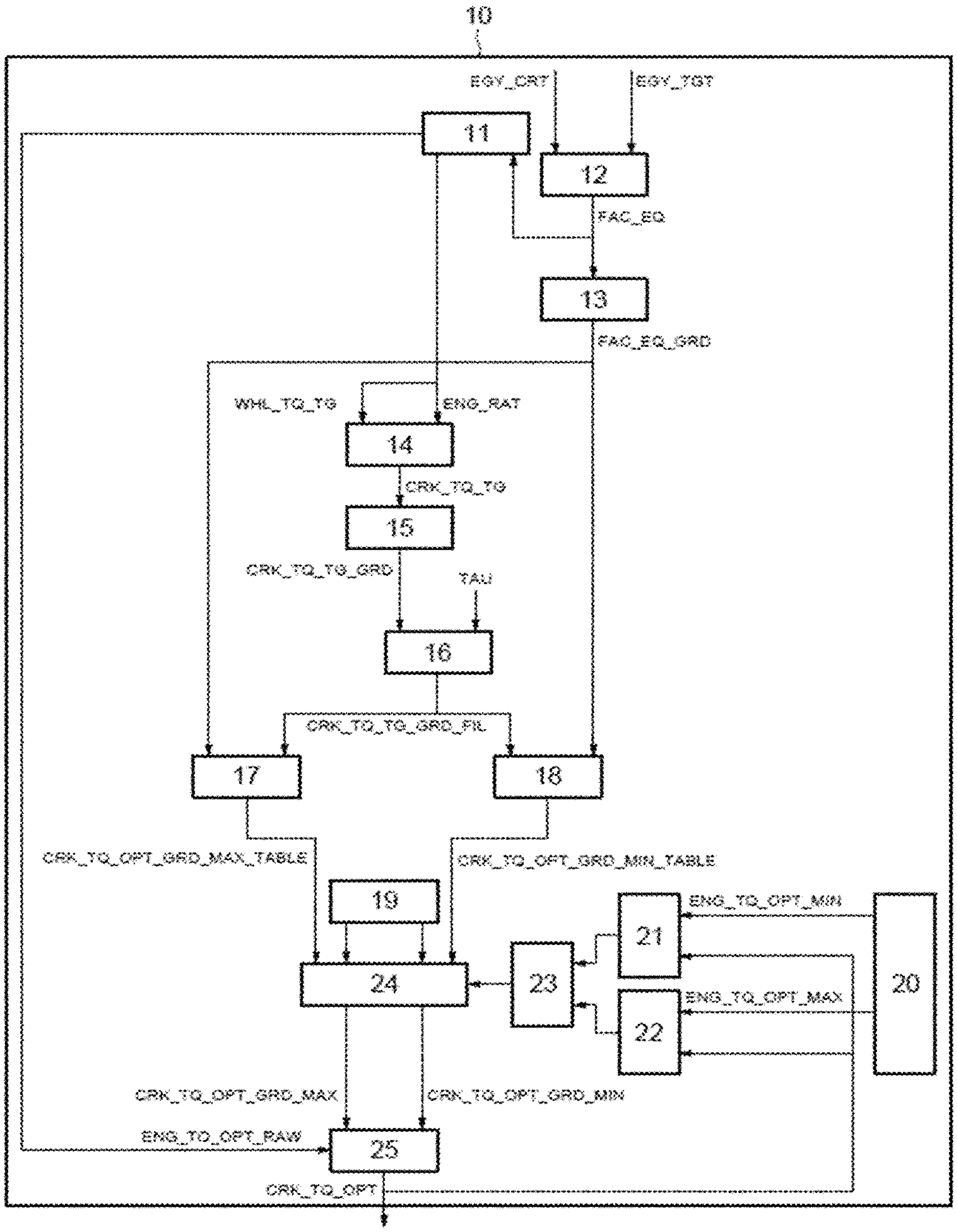
FIG. 2 illustrates the main elements of a control system according to the invention.

The invention also relates to a system for controlling a motor vehicle hybrid powertrain, illustrated in FIG. 2.

The control system 10 comprises a first calculation means 11 configured to execute an energy management law so as to determine the operating point of the hybrid powertrain, namely a combustion engine raw torque setpoint ENG_TQ_OPT_RAW as a function of the overall consumption of the powertrain, via an analytical solution to the equation making it possible to define the operating point that involves the lowest possible consumption.

A second calculation means 12 is configured to determine the equivalence factor FAC_EQ as a function of the current energy present in the battery and of the target battery energy.

A third calculation means 13 determines the equivalence factor gradient FAC_EQ_GRD as a function of the equivalence factor FAC_EQ at the current instant, of a memory-stored value of the equivalence factor FAC_EQ at a preceding instant, and of the duration between the current instant and the preceding instant. At its first occurrence, the gradient is initialized to its current value.

A fourth calculation means 14 determines the crankshaft torque CRK_TQ_TG as a function of the target torque required at the wheel WHL_TQ_TG and of the step-down gear ratio ENG_RAT.

A fifth calculation means 15 determines the crankshaft torque gradient CRK_TQ_TG_GRD as a function of the crankshaft torque CRK_TQ_TG at the current instant, of a memory-stored value of the crankshaft torque CRK_TQ_TG at a preceding instant, and of the duration between the current instant and the preceding instant. At its first occurrence, the gradient is initialized to a predefined default value.

A filtering means 16 performs first-order filtering on the crankshaft torque gradient CRK_TQ_TG_GRD on the basis of a time constant TAU.

A sixth calculation means 17 associated with a memory containing a first table TABLE_2D_GRD_POS_MAX is configured to determine a combustion engine torque gradient maximum value CRK_TQ_OPT_GRD_MAX_TABLE as a function of the equivalence factor gradient FAC_EQ_GRD and of the crankshaft torque gradient CRK_TQ_TG_GRD_FIL.

A seventh calculation means 18 associated with a memory containing a table TABLE_2D_GRD_POS_MIN is configured to determine a combustion engine torque gradient minimum value CRK_TQ_OPT_GRD_MIN_TABLE as a function of the equivalence factor gradient FAC_EQ_GRD and of the crankshaft torque gradient CRK_TQ_TG_GRD_FIL.

A first memory 19 contains a default combustion engine torque gradient minimum value CRK_TQ_OPT_GRD_MIN_DFT and a default combustion engine torque gradient maximum value CRK_TQ_OPT_GRD_MAX_DFT.

A second memory 20 contains a combustion engine optimal torque minimum value ENG_TQ_OPT_MIN and a combustion engine optimal torque maximum value ENG_TQ_OPT_MAX.

A first comparison means 21 is configured to determine whether the current combustion engine optimal torque value ENG_TQ_OPT is higher than the combustion engine optimal torque minimum value ENG_TQ_OPT_MIN and to emit a first value if it is, or a second value if it is not.

A second comparison means 22 is configured to determine whether the current combustion engine optimal torque value ENG_TQ_OPT is lower than the combustion engine optimal torque maximum value ENG_TQ_OPT_MAX and to emit a first value if it is, or a second value if it is not.

A Boolean operator 23 is configured to apply an OR truth table to the values received from the first comparison means 20 and from the second comparison means 21.

A switch 24 makes it possible to choose the combustion engine torque gradient minimum value CRK_TQ_OPT_GRD_MIN_TABLE and the combustion engine torque gradient maximum value CRK_TQ_OPT_GRD_MAX_TABLE if a second value is received from the Boolean operator 23, and to choose the default combustion engine torque gradient minimum value CRK_TQ_OPT_GRD_MIN_DFT and the default combustion engine torque gradient maximum value CRK_TQ_OPT_GRD_MAX_DFT if a first value is received from the Boolean operator 23.

An eighth calculation means 25 is configured to determine the optimal torque setpoint ENG_TQ_OPT as a function of the raw torque setpoint ENG_TQ_OPT_RAW and of the values received from the switch 24, by means of the following logic:

$$ENG\_TQ\_OPT(t) = Max(Min(ENG\_TQ\_OPT\_RAW(t); ENG\_TQ\_OPT(t-dt) + CRK\_TQ\_OPT\_GRD\_MAX*dt); ENG\_TQ\_OPT(t-dt) + CRK\_TQ\_OPT\_GRD\_MIN*dt)$$

Where t is the current calculation step and dt is the duration between two consecutive calculations in the strategy.

It will be appreciated that the various memories may also be distinct memory spaces comprised within the one same physical memory.

The invention claimed is:

1. A method for controlling a motor vehicle hybrid powertrain comprising a combustion engine and at least one electric machine associated with a battery, the method comprising:

using an energy management law to determine an optimal raw torque setpoint for the combustion engine as a function of overall consumption of the powertrain, the consumption of the combustion engine and of at least one electric machine;

determining an equivalence factor and a gradient of the equivalence factor as a function of a current energy present in the battery and of a target battery energy;

determining a crankshaft torque as a function of a target torque required at a wheel and of step-down gearing, which are obtained from the energy management law, and determining a crankshaft torque gradient;

determining a combustion engine torque gradient minimum value and a combustion engine torque gradient maximum value using parameterizable tables each dependent on the gradient of the equivalence factor and on a filtered crankshaft target torque gradient; and determining the optimal combustion engine torque as a function of the combustion engine raw torque setpoint by limiting dynamics of change thereof as a function of the combustion engine torque gradient minimum value and the combustion engine torque gradient maximum value, wherein the method further comprises determining that a first logic value adopts a first value when a predefined minimum value for the optimal combustion engine torque is higher than the optimal combustion engine torque value, and the first logic value adopts a second value when the predefined minimum value for the optimal combustion engine torque is not higher than the optimal combustion engine torque value.

2. The control method as claimed in claim 1, further comprising first-order filtering of the crankshaft torque gradient as a function of a memory-stored time constant.

3. The control method as claimed in claim 1, further comprising:

determining that a second logic value adopts a first value when a predefined maximum value for the optimal combustion engine torque is lower than the optimal combustion engine torque value, and the second logic value adopts a second value when the predefined maximum value for the optimal combustion engine torque is not lower than the optimal combustion engine torque value;

determining a selection value as a function of the logic OR operation performed between the first logic value and the second logic value; and transmitting, for the determination of the optimal combustion engine torque, a first set comprising the combustion engine torque gradient minimum value and the combustion engine torque gradient maximum value by way of final minimum combustion engine torque gradient and final maximum combustion engine torque gradient when the selection value adopts the second value, and transmitting a second set of predefined values comprising a default combustion engine torque gradient minimum value and a default combustion engine torque gradient maximum value when the selection value adopts the first value.

4. The control method as claimed in claim 3, wherein the default combustion engine torque gradient minimum value has a value that is lower than the combustion engine torque gradient minimum value, and the default combustion engine torque gradient maximum value has a value that is higher than the combustion engine torque gradient maximum value.

5. The control method as claimed in claim 1, further comprising:

determining that a second logic value adopts a first value when a predefined maximum value for the optimal combustion engine torque is lower than the optimal combustion engine torque value, and the second logic value adopts a second value when the predefined maximum value for the optimal combustion engine torque is not lower than the optimal combustion engine torque value.

6. The control method as claimed in claim 5, further comprising:

determining a selection value as a function of the logic OR operation performed between the first logic value and the second logic value.

7. The control method as claimed in claim 6, further comprising:

transmitting, for the determination of the optimal combustion engine torque, a first set comprising the combustion engine torque gradient minimum value and the combustion engine torque gradient maximum value by way of final minimum combustion engine torque gradient and final maximum combustion engine torque gradient when the selection value adopts the second value.

8. A system for controlling a motor vehicle hybrid powertrain, comprising:

a first calculation unit, implemented by circuitry, configured to execute an energy management law so as to determine a combustion engine raw torque setpoint;

a second calculation unit, implemented by the circuitry, and a third calculation unit, implemented by the circuitry, which are configured to determine a gradient of an equivalence factor as a function of consumptions of the powertrain;

a fourth calculation unit, implemented by the circuitry, and a fifth calculation unit, implemented by the circuitry, which are configured to determine a crankshaft torque gradient as a function of a target torque required of a wheel and of a step-down gear ratio;

a sixth calculation unit, implemented by the circuitry, and a seventh calculation unit, implemented by the circuitry, which are configured respectively to determine a combustion engine torque gradient maximum value and minimum value as a function of the gradient of the equivalence factor, of the crankshaft torque gradient and of a table stored in memory of the respective calculation units;

an eighth calculation unit, implemented by the circuitry, configured to determine an optimal torque setpoint as a function of the raw torque setpoint and of the combustion engine torque gradient minimum and maximum values so as to modify dynamics of change thereof, and a first comparison unit, implemented by the circuitry, configured to emit a first value when a current optimal combustion engine torque value is higher than an optimal combustion engine torque minimum value and to emit a second value when the current optimal combustion engine torque value is not higher than an optimal combustion engine torque minimum value.

9. The control system as claimed in claim 8, further comprising a filtering unit, implemented by the circuitry, configured to perform first-order filtering of the crankshaft torque gradient transmitted to the sixth calculation unit and to the seventh calculation unit, as a function of a memory-stored time constant.

10. The control system as claimed in claim 8, further comprising:

a first memory containing a default combustion engine torque gradient minimum value and a default combustion engine torque gradient maximum value;

a second memory containing the optimal combustion engine torque minimum value and an optimal combustion engine torque maximum value;

a second comparison unit, implemented by the circuitry, configured to emit a first value when the current optimal combustion engine torque value is lower than the optimal combustion engine torque maximum value and to emit a second value when the current optimal combustion engine torque value is not lower than the optimal combustion engine torque maximum value;

a Boolean operator configured to apply an OR truth table to the first value and the second value received from the first comparison unit and from the second comparison unit; and a switch configured to transmit, to the eighth calculation unit, the combustion engine torque gradient minimum value and the combustion engine torque gradient maximum value when a second value is received from the Boolean operator, and to transmit the default combustion engine torque gradient minimum value and the default combustion engine torque gradient maximum value when a first value is received from the Boolean operator.

* * * * *